US009300167B2

(12) United States Patent
Hung et al.

(10) Patent No.: US 9,300,167 B2
(45) Date of Patent: Mar. 29, 2016

(54) CIRCULATING CHARGING/DISCHARGING DEVICE FOR AN ELECTRIC VEHICLE

(71) Applicants: Huang-Chiang Hung, Kaohsiung (TW); Chang-Ning Hung, Kaohsiung (TW); An-Ying Hung, Kaohsiung (TW)

(72) Inventors: Huang-Chiang Hung, Kaohsiung (TW); Chang-Ning Hung, Kaohsiung (TW); An-Ying Hung, Kaohsiung (TW)

( * ) Notice: Subject to any disclaimer, the term of this patent is extended or adjusted under 35 U.S.C. 154(b) by 418 days.

(21) Appl. No.: 13/887,471

(22) Filed: May 6, 2013

(65) Prior Publication Data
US 2014/0327402 A1 Nov. 6, 2014

(51) Int. Cl.
*H02J 7/14* (2006.01)

(52) U.S. Cl.
CPC ............... *H02J 7/14* (2013.01); *Y02T 10/7005* (2013.01)

(58) Field of Classification Search
USPC ........................................................ 320/104
See application file for complete search history.

(56) References Cited

U.S. PATENT DOCUMENTS

2009/0088914 A1* 4/2009 Mizutani et al. ................ 701/22
2012/0065827 A1* 3/2012 Kimura et al. .................. 701/22

* cited by examiner

*Primary Examiner* — Robert Grant
(74) *Attorney, Agent, or Firm* — patenttm.us

(57) ABSTRACT

A circulating charging/discharging device for an electric vehicle has a battery assembly, a switch, a controller, a power generator motor, a power generator and a wheel motor. The battery assembly has a charging module and a discharging module connected in parallel. The battery assembly has output terminals connected to the switch. The controller turns on/off the switch and controls operations of the electric vehicle. The power generator motor and the wheel motor connect to the battery assembly through the switch for receiving power from the battery assembly. The wheel motor drives the wheel of the vehicle to let the vehicle move. When the vehicle is started, the battery assembly transmits power to the power generator motor through the switch so that the power generator motor drives the power generator for generating power used for charging the battery assembly. Therefore, the battery assembly is charged when the vehicle is moving.

8 Claims, 3 Drawing Sheets

CIRCULATING CHARGING/DISCHARGING DEVICE FOR AN ELECTRIC VEHICLE

BACKGROUND OF THE INVENTION

1. Field of the Invention

The present invention relates to a circulating charging/discharging device, and more particularly to a circulating charging/discharging device that charges an electric vehicle while the electric vehicle is moving.

2. Description of the Prior Art

With the advantages of quiet and exhaust-free, electric vehicles are gradually adopted in large cities and more and more people would like to use such environmentally safe transport.

As the name implies, the power for driving the electric vehicles is electricity energy. The electric vehicle is usually equipped with a high capacity energy storing device or a battery assembly. To start the electric vehicle, the energy storing device or the battery assembly will transmit power to a wheel motor. As the wheel motor operates, the vehicle can be driven by a driving system in the electric vehicle.

The moving distance of the electric vehicle depends on power capacity of the energy storing device or the battery assembly. Once the energy storing device or the battery assembly has been lower than a threshold, the car driver should look for a charging station to charge the electric vehicle.

However, the charging stations may not be widely spread. The car driver may not be quickly and conveniently find a charging station. Even if the charging station has been found, the car driver still needs a long time for charging.

To overcome the shortcomings, the present invention provides a circulating charging/discharging device to mitigate or obviate the aforementioned problems.

SUMMARY OF THE INVENTION

The main objective of the present invention is to provide a circulating charging/discharging device for an electric vehicle. When the electric vehicle is started, the device provides power to drive a wheel motor and is also charged. Therefore, the necessity of using a charging station to charge the battery assembly will be reduced.

The circulating charging/discharging device has a battery assembly, a switch, a controller, a power generator motor, a power generator and a wheel motor.

The battery assembly has a charging module and a discharging module connected in parallel to the charging module. The switch is connected to the output terminals of the battery assembly. The controller is connected to the switch for turning on or off the switch. The power generator motor is connected to the battery assembly through the switch and receives power stored in the battery assembly, wherein the power generator motor has an axle. The power generator is connected to the axle of the power generator motor and driven by the power generator motor for generating power, wherein the power generator is connected to the battery assembly through and charges the battery assembly. The wheel motor connected to the battery through the switch and receiving the power stored in the battery assembly, wherein the wheel motor is for driving a wheel of the electric vehicle to rotate.

When the user starts the electric vehicle, the controller receives a signal and then turns the switch on. The power stored in the battery assembly can be transmitted to the power generator motor and the wheel motor through the switch. When the power generator motor receives the power and then drives the power generator to generate power, the generated power is transmitted to the battery assembly for charging. Thus, the battery assembly is automatically charged when the electric vehicle moves to prolong the time of power supplying. The necessity of using a charging station to the battery assembly is also reduced. The user does not need to wait a long time for charging the battery assembly. Furthermore, the size and weight of either the power generator motor or the power generator for the electric vehicle are relatively small and light so such motor and power generator will not be a heavy burden for the electric vehicle.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
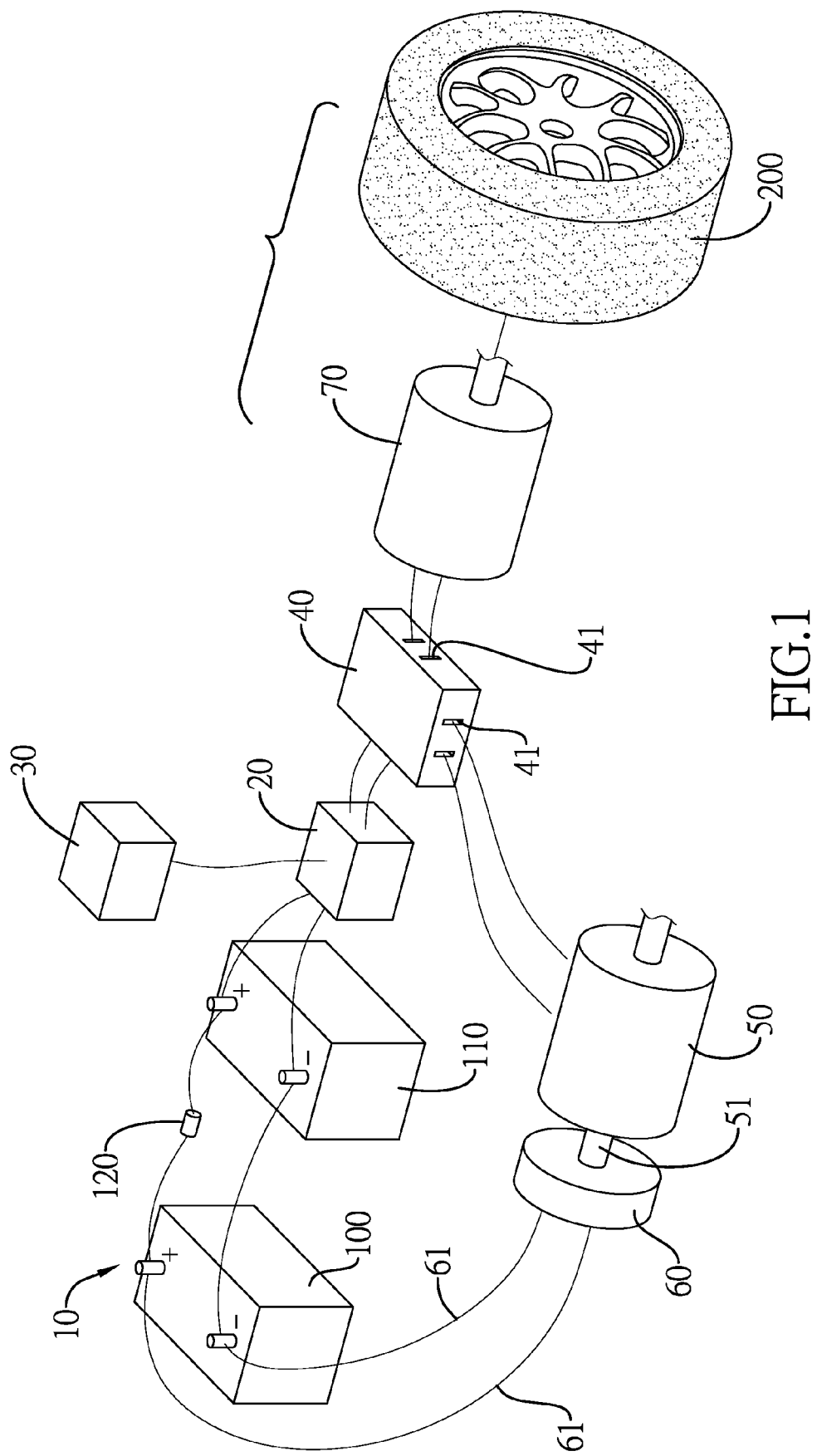
FIG. 1 shows a first preferred embodiment of a circulating charging/discharging device for an electric vehicle in accordance with the present invention.

With reference to FIG. 1, the circulating charging/discharging device for an electric vehicle in accordance with present invention comprises a battery assembly 10, a switch 20, a controller 30, a power distributor 40, a power generator motor 50, a power generator 60 and a wheel motor 70. The electric vehicle may be an electric car, an electric motorcycle and so forth.

The battery assembly 10 comprises at least one charging module 100 and a discharging module 110 connected in parallel. The battery assembly 10 may further comprise a diode 120. Each of the charging module 100 and the discharging module 110 is comprised of multiple batteries connected in parallel. Each of the charging module 100 and the discharging module 110 has a positive terminal and a negative terminal, wherein the positive terminals are connected together, and the negative terminals are connected together. The diode 12 is connected between the charging module 100 and the discharging module 110, wherein an anode of the diode 120 is connected to the charging module 100, and a cathode of the diode 120 is connected to the discharging module 110. The diode 120 limits power transmission from the charging module 100 to the discharging module 110. The power generated by the power generator 60 will be transmitted to the charging module 100 and then further to the discharging module 110 through the diode 120, whereby both the charging module 100 and the discharging module 110 are able to store power.

The positive terminal and the negative terminal of the discharging module 110 serve as output terminals of the battery assembly 10 and connect to input terminals of the switch 20. Output terminal of the switch 20 are connected to the power distributor 40. The switch 20 is also connected to the controller 30 and controlled by the controller 30. When a user wants to activate the electric vehicle, the switch is turned on by the controller so that the power stored in the battery assembly 10 can transmitted to the power distributor 40 through the switch 20. The controller 30 may be an internal controller of the electric vehicle and controls the vehicle to increase or decrease the moving speed.

The power distributor 40 has multiple output ports 41, wherein one of the output ports 41 is connected to the power generator motor 50 so that the power stored in the battery assembly 10 can be transmitted to the power generator motor 50.

The power generator motor 50 has an axle 51 connected to an axle of the power generator 60. When the power generator motor 50 is activated to rotate, it drives the power generator 60 to rotate and generates power. The generated power is output to the batter assembly 10 through power cables 61 connected between the power generator 60 and the battery assembly 10. A linking device may be disposed between the power generator motor 50 and the power generator 60. The linking device may comprise gears, belts or other driving elements. The rotating ratio between the power generator motor 50 and the power generator 60 may be adjusted by using gears of different sizes for changing the power generation capability of the power generator 60. To increase heat dissipation effect of the power generator motor 50, a heat sink or a heat radiator may be may be attached to the motor 50 to avoid the problem of over heat. The power generator 60 and the power generator motor 50 may by mounted at proper positions of the electric vehicle.

The wheel motor 70 is connected to the battery assembly 10 through the switch 20 and receives the power supplied by the battery assembly 10. The wheel motor 70 is used for driving the wheel of the electric vehicle. In a first preferred embodiment, another one of the output ports 41 of the power distributor 40 is connected to the wheel motor 70. For example, the wheel motor 70 may be connected to the wheel through driving mechanism. When the wheel motor 70 is activated, the wheel motor 70 develops power to drive the wheel and make the electric vehicle move forward. The wheel motor 70 may be a wheel hub motor that is mounted in the wheel, or an external motor mounted outside the wheel. With reference to FIG. 1, the wheel motor 70 is a usual motor mounted outside the wheel 200.

Figure 2:
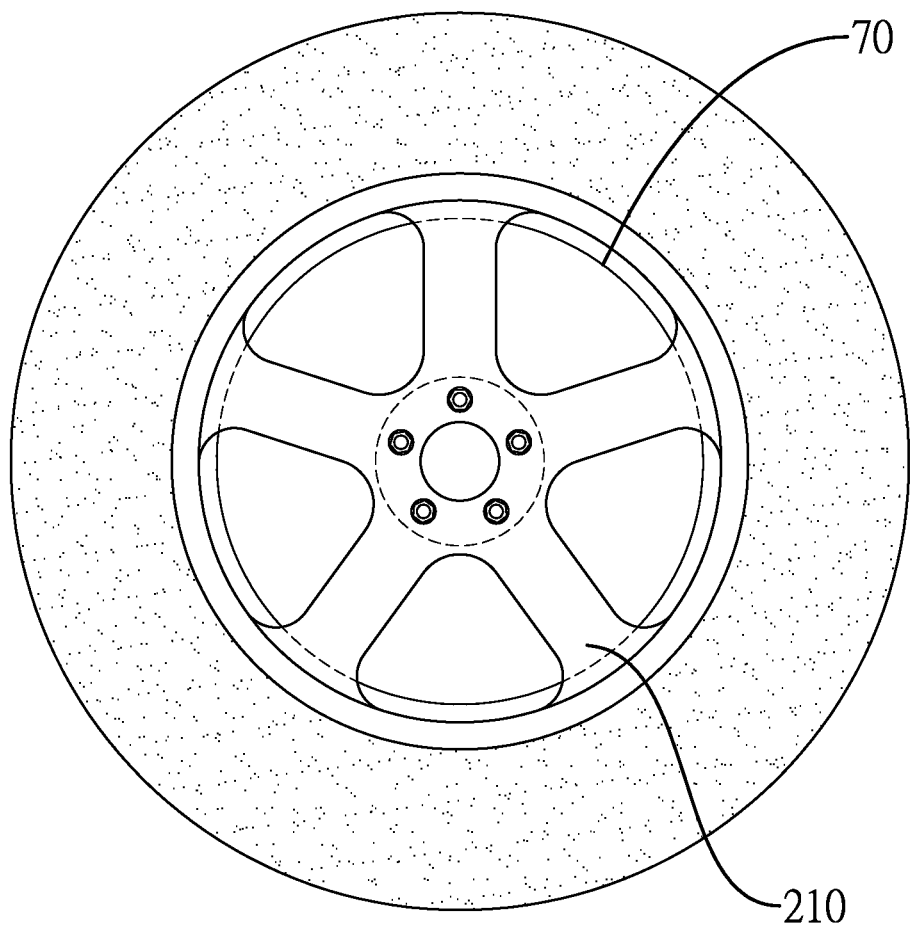
FIG. 2 shows a wheel hub motor as a wheel motor used for the circulating charging/discharging device in accordance with the present invention.

With reference to FIGS. 1 and 2, the wheel motor 70 is a wheel hub motor, wherein each wheel of the electric vehicle has a wheel hub motor. The wheel hub motor is mounted in the wheel frame 210. When the wheel motor 70 is activated, the axle of the wheel motor 70 drives the wheel frame to rotate so that the electric vehicle can move. When the user starts the electric vehicle, the controller 30 receives a start signal and accordingly turns on the switch 20. The power stored in the battery assembly 10 transmits through the switch 20, the power distributor 70 to the power generator motor 50 and the wheel motor 70. The wheel motor 70 is activated to drive the electric vehicle and the power generator motor 50 is also powered at the same time. The power generator motor 50 drives the power generator 60 to generate electricity. The power generated by the power generator 60 is transmitted to the battery assembly 10 to charge the battery assembly 10.

For the battery assembly 10, it supplies its power to the power generator motor 50 and the wheel motor 70 when the electric vehicle is started, and is also charged by the power generator 60.

With the present invention, the power generator 60 automatically charges the battery assembly 10 when the electric vehicle is moving. The battery assembly 10 can be continuously charged to replenish a part of power consumed by the wheel motor 70. Therefore, the necessity of using a charging station to the battery assembly 10 will be reduced.

Figure 3:
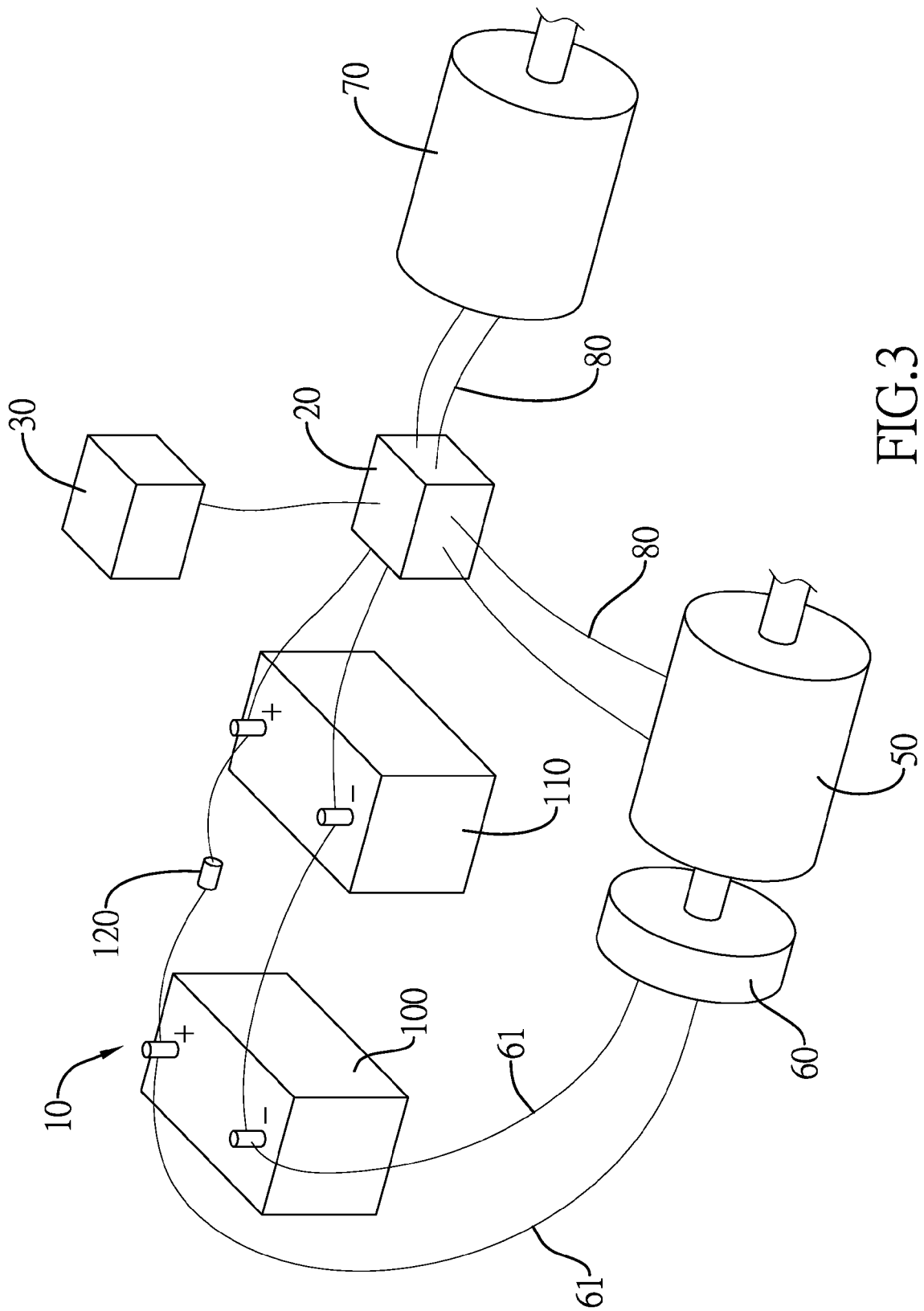
FIG. 3 shows a second preferred embodiment of a circulating charging/discharging device for an electric vehicle in accordance with the present invention.

With reference to FIG. 3, in a second preferred embodiment, the power distributor 40 is replaced with power wires 80. The power wires 80 are connected to the switch 20, the power generator motor 50 and the wheel motor 70 for transmitting the power to the power generator motor 50 and the wheel motor 70.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A circulating charging/discharging device for an electric vehicle, the device comprising:
   a battery assembly having a charging module, a discharging module connected in parallel to the charging module, and output terminals;
   a switch connected to the output terminals of the battery assembly;
   a controller connected to the switch for turning on or off the switch;
   a power generator motor connected to the battery assembly through the switch for receiving power stored in the battery assembly, wherein the power generator motor has an axle;
   a power generator connected to the axle of the power generator motor and driven by the power generator motor for generating power, wherein the power generator is connected to the battery assembly through power cables and charges the battery assembly; and
   a wheel motor connected to the battery through the switch and receiving the power stored in the battery assembly, wherein the wheel motor is for driving a wheel of the electric vehicle to rotate;
   wherein the power generator motor and the wheel motor are connected to the switch through a power distributor;
   wherein the power distributor has multiple output ports, one of the output ports is connected to the power generator motor, and another one of the output ports is connected to the wheel motor.

2. The device as claimed in claim 1, wherein the power generator motor and the wheel motor are connected to the switch through power wires.

3. The device as claimed in claim 1, wherein the charging module and the discharging module respectively comprise multiple batteries connected in parallel.

4. The device as claimed in claim 2, wherein the charging module and the discharging module respectively comprise multiple batteries connected in parallel.

5. The device as claimed in claim 3, wherein a diode is connected between the charging module and the discharging module, an anode of the diode is connected to the charging module and a cathode of the diode is connected to the discharging module.

6. The device as claimed in claim 4, wherein a diode is connected between the charging module and the discharging module, an anode of the diode is connected to the charging module and a cathode of the diode is connected to the discharging module.

7. The device as claimed in claim 1, wherein the wheel motor is a wheel hub motor for being mounted in the wheel.

8. The device as claimed in claim 1, wherein the wheel motor is an external motor for being mounted outside the wheel.

* * * * *